United States Patent [19]
Vaihoja et al.

[11] Patent Number: 5,842,141
[45] Date of Patent: *Nov. 24, 1998

[54] MOBILE TERMINAL HAVING USER-ACTUATED PAGER MODE

[75] Inventors: Juha Vaihoja, Tupos; Raimo Kivari, Haukipudas; Mikko Lietsalmi, Oulu; Jaakko Vanttila, Oulu; Jorma Seppanen, Oulu; Timo Kolehmainen, Oulu; Arto Pussinen, Oulu, all of Finland

[73] Assignee: Nokia Mobile Phones Limited, Salo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 582,608

[22] Filed: Jan. 1, 1996

[51] Int. Cl.$^6$ .................................................. H04Q 7/20
[52] U.S. Cl. ..................... 455/574; 455/31.2; 455/38.3; 455/343; 455/466
[58] Field of Search ................................. 455/31.1, 31.2, 455/31.3, 38.3, 127, 161.1, 161.2, 343, 435, 415, 434, 466, 458, 502, 574, 553, 556, 557; 340/825.44; 370/493–496

[56] References Cited

U.S. PATENT DOCUMENTS

| | | | |
|---|---|---|---|
| H610 | 3/1989 | Focarile et al. | 379/60 |
| 4,523,311 | 6/1985 | Lee et al. | 370/493 |
| 5,054,052 | 10/1991 | Nonami | 455/343 |
| 5,175,758 | 12/1992 | Levanto et al. | 379/57 |
| 5,301,225 | 4/1994 | Suzuki et al. | 455/343 |
| 5,353,329 | 10/1994 | Hayashi | 455/556 |
| 5,408,466 | 4/1995 | Ablay | 370/493 |
| 5,410,541 | 4/1995 | Hotto | 370/496 |
| 5,416,828 | 5/1995 | Hiramatsu et al. | 455/557 |
| 5,465,401 | 11/1995 | Thompson | 455/343 |
| 5,471,655 | 11/1995 | Kivari | 455/127 |
| 5,479,485 | 12/1995 | Hayashi | 455/556 |
| 5,526,398 | 6/1996 | Okada et al. | 455/553 |
| 5,541,976 | 7/1996 | Ghisler | 455/343 |

FOREIGN PATENT DOCUMENTS

WO 92/04797  3/1992  WIPO .

OTHER PUBLICATIONS

U.S. Statutory Invention Registration, H610, published Mar. 7, 1989 (Focarile et al.).

IS–136.1 (Nov. 14, 1994 and IS–136.1 Addendum (Apr. 26, 1995) pp. 26–28; 92, 93; 134–137; 247, 248; 286–307.

"European didital cellular telecommunications system (Phase 2); Unstructured Supplementary Service Data (USSD)—Stage 3 (GSM 04.90)", ETSI, Final Draft, Nov. 1994.

"European didital cellular telecommunications system (Phase 2); Stage 1 description of Unstructured Supplementary Service Data (USSD) (GSM 02.90)", ETSI, ETS 300 625, Jan. 1995.

Primary Examiner—Dwayne D. Bost
Assistant Examiner—Nay Maung
Attorney, Agent, or Firm—Perman & Green, LLP

[57] ABSTRACT

A method is disclosed for operating a cellular telephone that includes a first step, executed in response to input from a user, of disabling the cellular telephone from receiving cellular telephone calls. A second step then periodically enables the cellular telephone to receive, store and display user-related messages from a network control channel. In one embodiment the step of disabling includes a step of de-registering the cellular telephone from the network, and the step of periodically enabling includes an initial step of re-registering the cellular telephone with the network. The step of disabling may include a step of reducing the power consumption of the cellular telephone. In accordance with a further aspect of this invention the step of periodically enabling includes an initial step of requesting the network to assign the cellular telephone to a predetermined paging frame class that insures that the cellular telephone will receive a paging message from the network every n seconds. The step of periodically enabling thus further includes the step of placing the cellular telephone in a low power mode of operation for n-x seconds, where x is a period of time at least equal to a time required to resynchronize the cellular telephone to the network control channel.

23 Claims, 5 Drawing Sheets

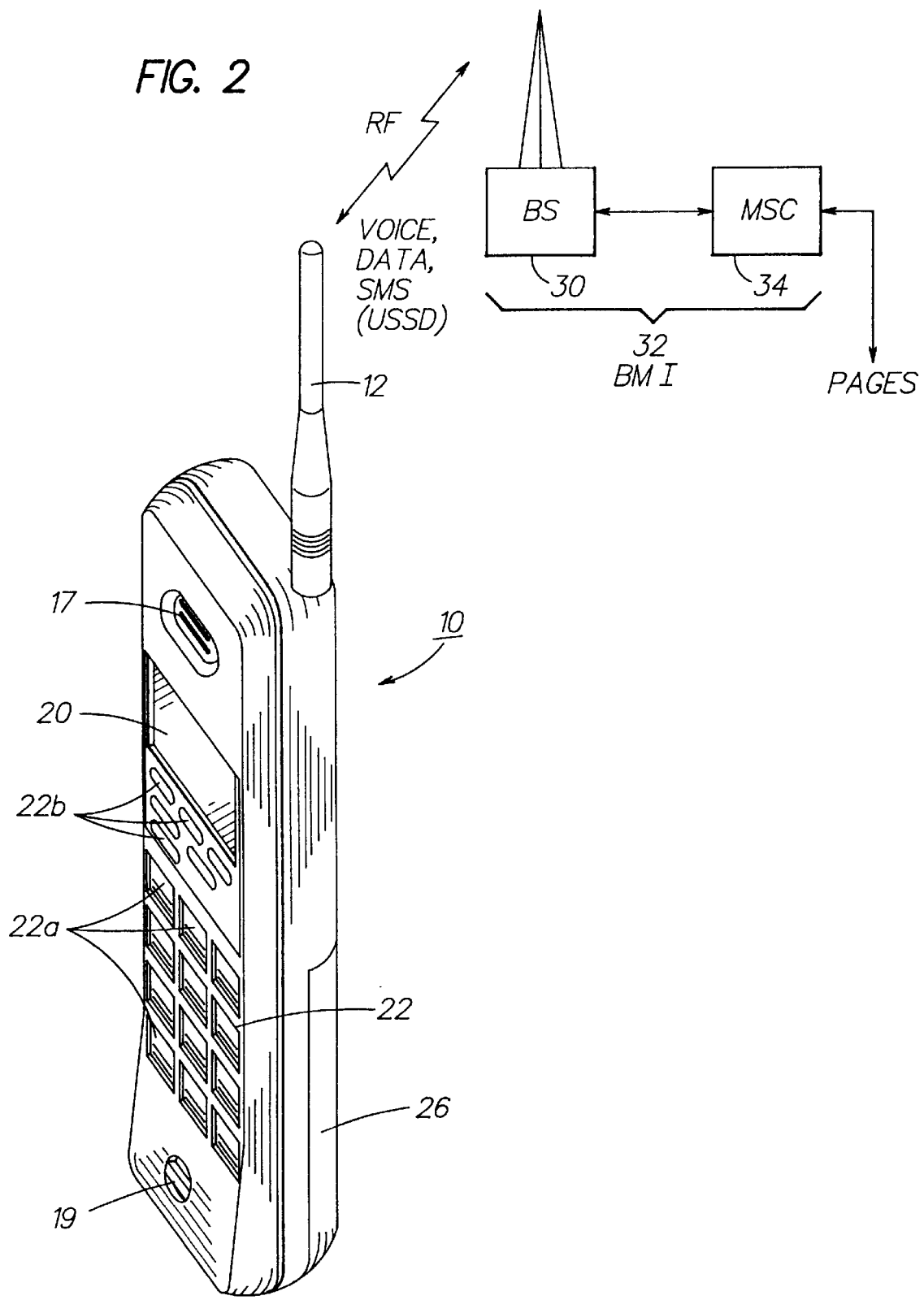

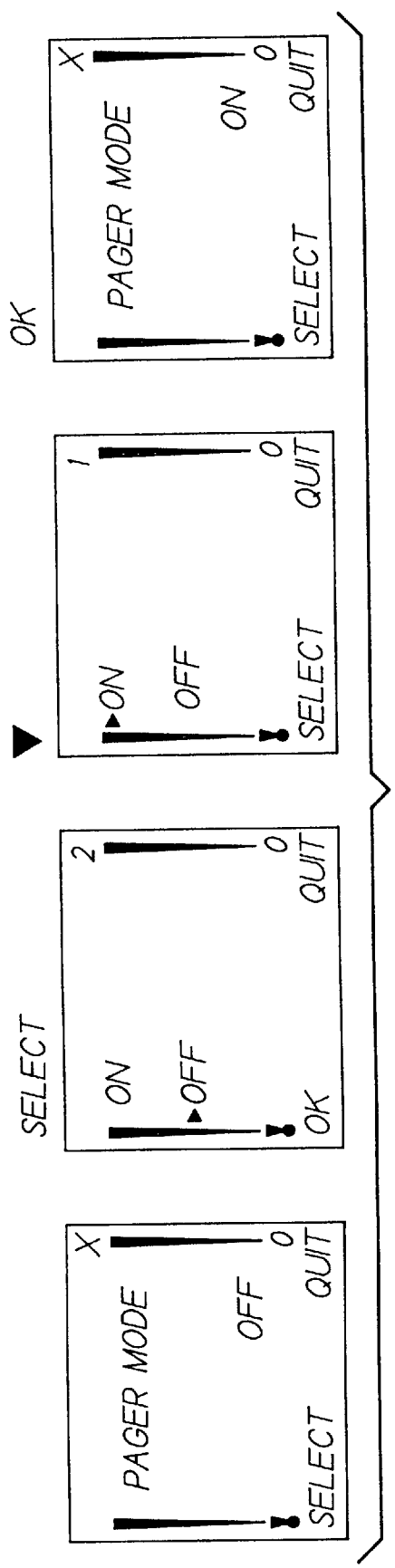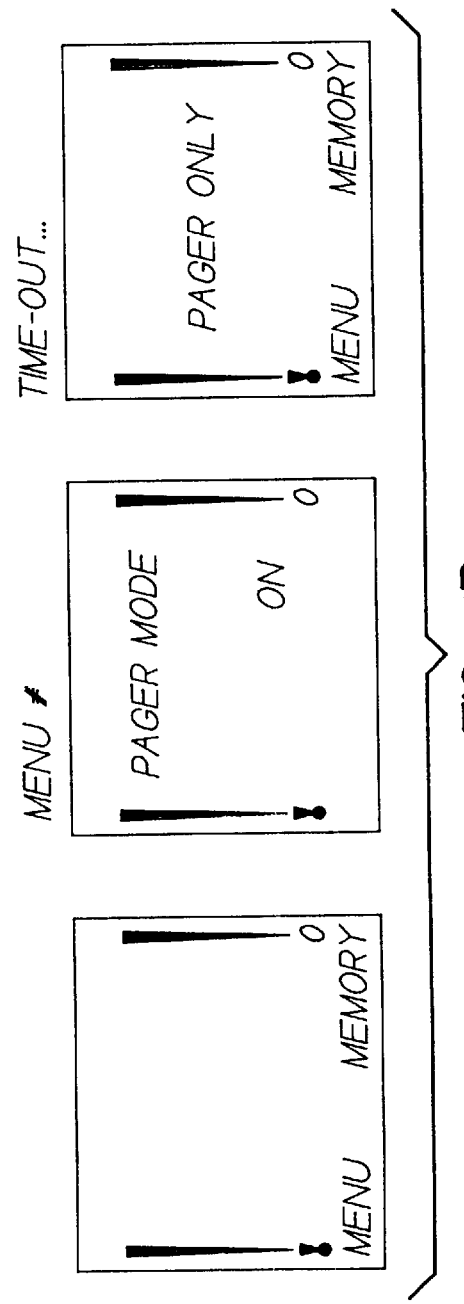
FIG. 3A
FIG. 3B

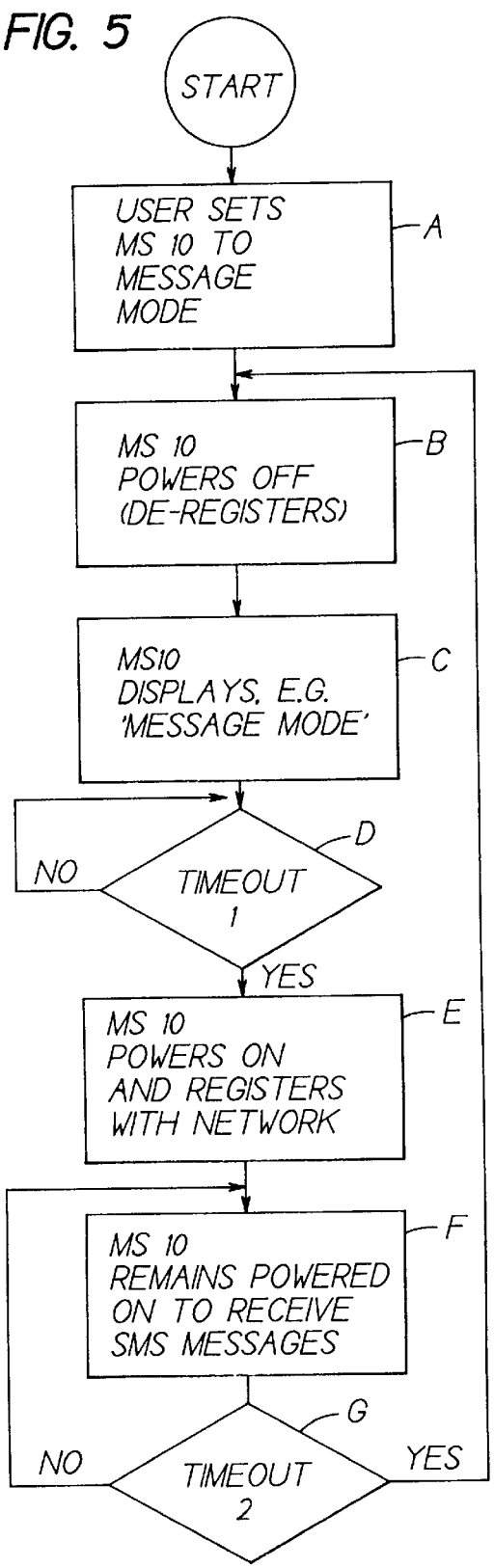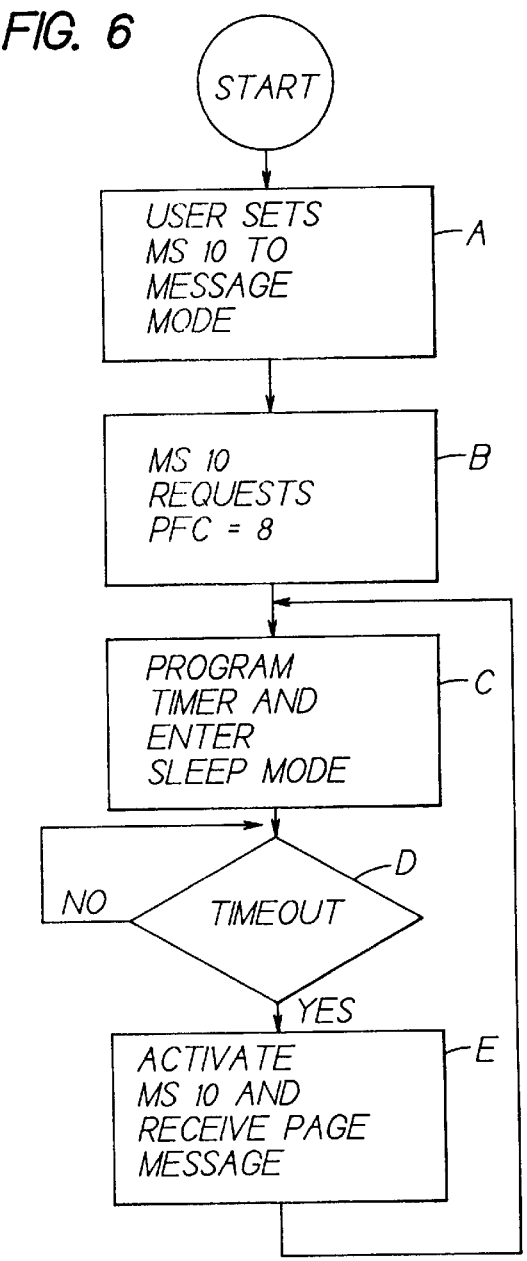

MOBILE TERMINAL HAVING USER-ACTUATED PAGER MODE

FIELD OF THE INVENTION

This invention relates generally to radiotelephones and, in particular, to mobile terminals such as those capable of operation with a cellular network.

BACKGROUND OF THE INVENTION

It is known in the art to provide a combined pager/cellular telephone, as evidenced by WO 92/04797 (Freeland et al.). In this device a combined pager and radiotelephone apparatus includes a pager section 102 and a cellular transceiver section 104. The pager section is capable of receiving and storing messages while the radiotelephone section is in use.

In U.S. Statutory Invention Registration No.: H610 (Mar. 7, 1989) Focarile et al. describe a pager device arranged for operation in a cellular radio system, specifically the AMPS system. A special set of channels are provided in the cellular radio system for signalling and call control functions. The pager scans this set of channels and tunes to the best and second best channels. Paging service to subscribers is said to be provided when the full service of a cellular telephone is not desired. The pager may be assigned the same number as an associated cellular telephone for providing backup service for telephone calls intended for the associated cellular telephone, which may not be "ON" because the subscriber is temporarily unavailable to answer an incoming call.

The foregoing two approaches suffer disadvantages resulting at least from the additional hardware and battery drain required to implement the pager function (Freeland et al.), and the requirement for a user to carry a pager unit in addition to the cellular telephone unit (Focarile et al.).

Power consumption is an important consideration in all types of communications systems wherein battery powered receivers or transceivers are employed. By example, in U.S. Pat. No. 5,471,655, issued Nov. 28, 1995, entitled "Method and Apparatus for Operating a Radiotelephone in an Extended Stand-by Mode of Operation for Conserving Battery Power", Raimo Kivari (a co-inventor of the subject matter of this patent application) describes techniques for conserving battery power in a user terminal of a cellular communications system. The above-mentioned AMPS system is one suitable embodiment of a cellular communications system for practicing the invention of U.S. Pat. No. 5,471,655.

The so-called Short Message Service (SMS) is a service specified in some modern cellular communications systems for enabling a user to send messages to, and receive text messages from, other users of a communications (cellular) network. The SMS attempts to deliver a message to a mobile terminal whenever the terminal is registered to the network, even when the terminal is engaged in a voice or data call. The terminal may roam throughout the network and still be capable of sending and receiving messages. A terminal configured for SMS provides methods for the user to receive, read, write/edit, clear, send, and save messages. The connection of a standard keyboard to the terminal facilitates the generation and editing of text messages by the user.

In GSM Phase II, 04.90, 02.90, there is described a Supplementary Service (SS) feature that is referred to as Unstructured Supplementary Service Data (USSD). This feature enables the network to send a string of characters to a mobile station, and enables the mobile station to send a string of characters to the network.

OBJECTS OF THE INVENTION

It is an object of this invention to provide a cellular communications system that implements a paging function using cellular telephone transceivers.

It is a further object of this invention to provide an improved cellular telephone which is responsive to input from a user for being configured as a paging terminal.

It is another object of this invention to provide a cellular telephone which is responsive to a first input from a user to enter a low power paging mode of operation, and which is responsive to a second input from a user to enter a cellular telephone mode of operation.

SUMMARY OF THE INVENTION

The foregoing and other problems are overcome and the objects of the invention are realized by methods and apparatus in accordance with embodiments of this invention. A method of this invention is disclosed for operating a user terminal, such as a cellular radiotelephone, of a type that is bidirectionally coupled to a network through an RF interface. The method includes a first step, executed in response to input from a user, of disabling the cellular telephone from receiving cellular telephone calls. A second step periodically enables the cellular telephone to receive user-related messages from a network control channel, and to thus store and eventually display the messages to the user.

In one embodiment of this invention the step of disabling includes a step of de-registering the cellular telephone from the network, and the step of periodically enabling includes an initial step of re-registering the cellular telephone with the network.

In accordance with an aspect of this invention the step of disabling may include a step of reducing the power consumption of the cellular telephone, and the step of periodically enabling then includes an initial step of restoring the power consumption of the cellular telephone to an operational level.

In accordance with a further aspect of this invention the step of periodically enabling includes an initial step of requesting the network to assign the cellular telephone to a predetermined paging frame class. The predetermined paging frame class is one that insures that the cellular telephone will receive a paging message from the network every n seconds. The step of periodically enabling thus further includes the step of placing the cellular telephone in a low power mode of operation for n-x seconds, where x is a period of time at least equal to a time required to resynchronize the cellular telephone to the network control channel.

In various embodiments of this invention the step of periodically enabling also receives at least one Short Message Service (SMS) message from the network, and/or receives at least one Callback Number message from the network, and/or receives at least one Voice Mail Notification message from the network, and/or receives at least one USSD message.

The cellular telephone may also compose and transmit a message to the network in response to a received page, thereby implementing a two-way paging service.

BRIEF DESCRIPTION OF THE DRAWINGS

The above set forth and other features of the invention are made more apparent in the ensuing Detailed Description of the Invention when read in conjunction with the attached Drawings, wherein:

FIG. 2 is an elevational view of the mobile terminal shown in FIG. 1, and which further illustrates a cellular communication system to which the mobile terminal is bidirectionally coupled through wireless RF links;

FIGS. 3A and 3B illustrate various menu displays that are presented to the user by a cellular telephone in accordance with an aspect of the teaching of this invention;

FIG. 5 is a logic flow diagram illustrating one method of this invention; and

FIG. 6 is a logic flow diagram illustrating a second method of this invention.

DETAILED DESCRIPTION OF THE INVENTION

Figure 1:
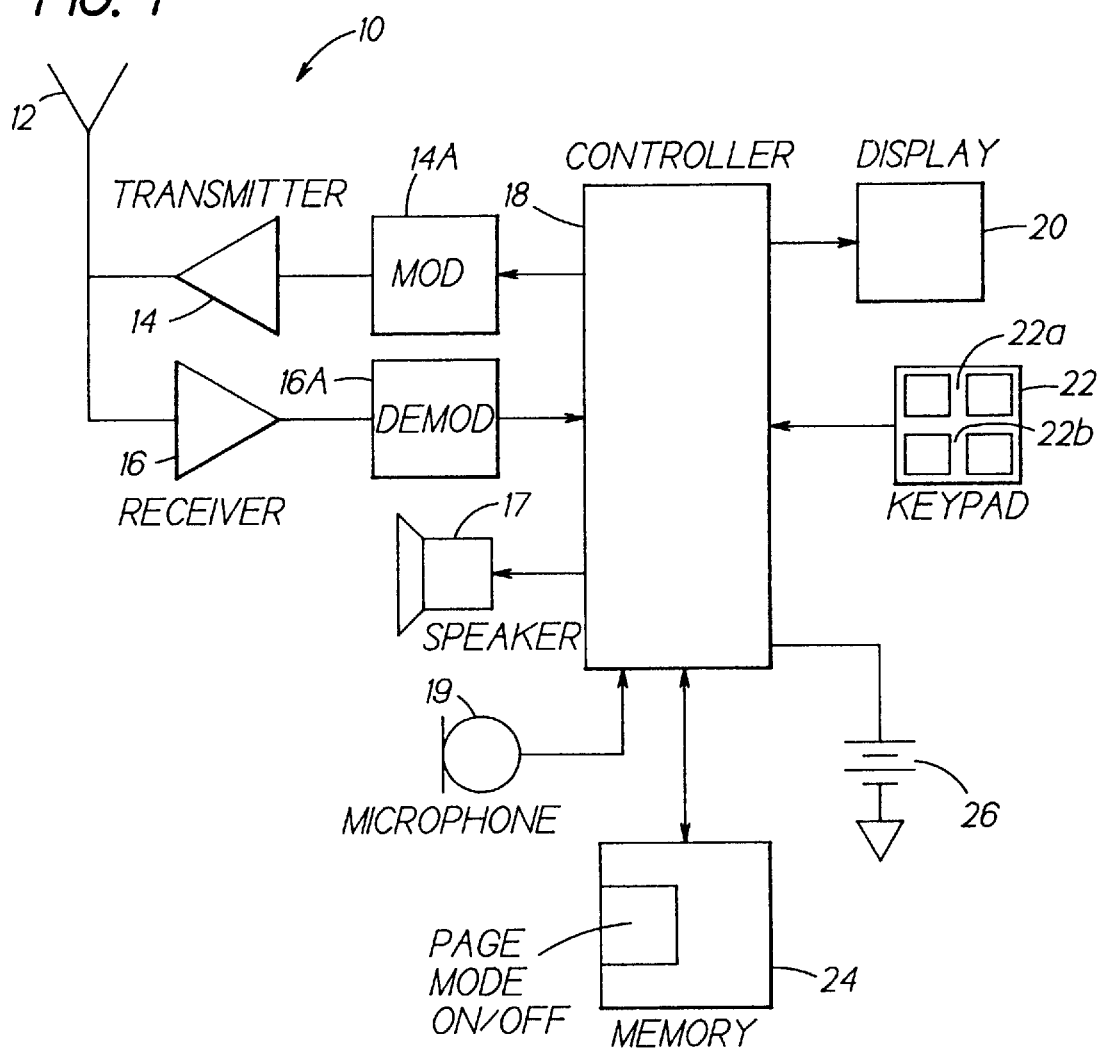
FIG. 1 is a block diagram of a mobile terminal that is constructed and operated in accordance with this invention.

Reference is made to FIGS. 1 and 2 for illustrating a mobile terminal 10, in particular a cellular radiotelephone, that is suitable for practicing this invention. The mobile terminal 10 includes an antenna 12 for transmitting signals to and for receiving signals from a base site or base station 30. The base station 30 is a part of a cellular network 32 that includes a mobile switching center (MSC) 34. The MSC 34 is capable of routing messages to and from the user terminal 10 when the user terminal is registered with the network. The cellular network 32 may also be referred to as a Base station/MSC/Interface function (BMI). For two-way paging systems, replies and/or acknowledgements from users of the mobile stations 10 can flow back to the BMI 32.

The mobile terminal includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for one embodiment of this invention to include a SMS capability, wherein a SMS message can be addressed to a specific mobile terminal. The mobile terminal may also be capable of receiving and responding to broadcast (e.g., global) messages that address a plurality of mobile terminals. The air interface standard is assumed for another embodiment of this invention to include a USSD capability.

A user interface includes a conventional speaker 17, a conventional microphone 19, a display 20, and a user input device, typically a keypad 22, all of which are coupled to the controller 18. The keypad 22 includes numeric and alphanumeric keys, related keys (#,*) 22a, and also other keys 22b used for operating the mobile terminal 10. These other keys 22b may include, by example, a SEND key, various menu scrolling and soft keys, and a PWR key.

The mobile terminal 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of controller 18 is also stored in the memory 24 (typically in a ROM device). The memory 24 also stores data, including user messages, that are received from the cellular network 32 prior to the display of the messages to the user. In general, the operating program in the memory 24 includes routines to present messages and message-related functions to the user on the display 20, typically as various menu items. The memory 24 also includes routines for implementing the method described below in relation to FIGS. 3A, 3B, and 5–7.

The mobile terminal 10 also includes a battery 26 for powering the various circuits that are required to operate the terminal.

It should be understood that the mobile terminal 10 can be a vehicle mounted or a handheld device. It should further be appreciated that the mobile terminal 10 can be capable of operating with one or more air interface standards, modulation types, and access types. By example, the mobile terminal may be capable of operating in accordance with a frequency modulated (FM), frequency division multiple access (FDMA) transmission and reception standard, such as one known as EIA/TIA-553 (AMPS). The terminal may also be capable of operating with any of a number of other analog or digital standards, such as GSM/DCS, PDC, EIA/TIA 627 (DAMPS), IS-136 (DDAMPS), and IS-95 (CDMA). Narrow-band AMPS (NAMPS), as well as TACS, mobile terminals may also benefit from the teaching of this invention. GSM Phase II, 04.90, 02.90, compatible mobile terminals are also within the scope of this invention. In general, the teaching of this invention applies to any radiotelephone or pager user terminal that is capable of receiving a message from a system, that includes a display for displaying messages and a menu of mobile terminal functions to a user, and that furthermore includes a user input device, such as a keypad, with which the user can generate messages and also interact with the displayed menu to select various mobile terminal functions. It should thus be clear that the teaching of this invention is not to be construed to be limited to any one particular type of mobile terminal or air interface standard.

One presently preferred air interface standard is one specified by IS-136.1, Rev. 0, May 17, 1994, which includes facilities for SMS, a plurality of paging frame classes, and also a mechanism for a user terminal to register and de-register with the system. This invention exploits to advantage these and other features of IS-136.1 so as to provide a low cost, low power consumption paging function in a cellular transceiver or user terminal. However, and as was indicated above, the teaching of this invention is not to be construed to be limited for use only with this one air interface standard.

The IS-136.1 standard specifies the structure and information elements of SMS messages in paragraphs 7.1–7.3 (IS-136.1, Rev. 0, May 17, 1994, pp. 286–305). There is an information element referred to in paragraph 7.2.1 as a "User Data Unit", which is specified to carry a user text message. Other sections of IS-136.1 that are exploited by the teaching of this invention include paragraph 4.7 (Paging Frame), pp. 26–28; paragraph 6.2.4 (Registration Proceeding (D4)), pp. 92–93; paragraph 6.3.7 (Registration), pp. 134–137; and pages 247–248 wherein are described the Paging Frame Class (PFC) Assignment, the PFC Minus One (indicating the current PFC of a mobile station), and a PFC Request (which identifies the PFC requested by a mobile station).

Reference is now made to FIGS. 3A and 3B for illustrating a method in accordance with this invention. It is first noted that in FIGS. 3A and 3B the icon shown on the left of the display is a received signal strength indicator, and the icon shown on the right of the display is a battery level indicator. Neither of these icons forms a part of the teaching of this invention. The number shown in the upper right portion of the display indicates the level of the display (i.e., the menu number). The symbol ▼ above a display indicates that a down arrow menu scrolling key is depressed to move a display cursor ▶ down by one menu item.

In FIGS. 3A and 3B it can be seen that the user is enabled to select a Message or Pager Mode and to selectively turn this mode off and on. FIG. 3A illustrates this procedure when the Pager Mode is accessed from the menu, while FIG. 3B shows this procedure when pressing Menu and # keys (menu number).

When the Pager Mode is off the mobile station 10 is enabled to receive incoming calls in a normal fashion. When the Pager Mode is on incoming calls are not received. Instead, only network messages (voice mail notification, callback numbers, SMS messages, USSD messages and the like, etc.) are received. The user may or may not be alerted, depending upon the setting of an alerting options menu. The default setting is Pager Mode off.

When the Pager Mode is selected the MS 10 (user interface) may not recognize incoming call messages (pages) from the network. As a result, the network forwards calls to, for example, a voice mail service, which then sends a voice mail waiting message or a callback number message to the mobile station 10. These messages are received by the mobile station, and are displayed to the user.

An important aspect of this invention is the power saving capability that is realized when the mobile station is operated in the pager mode. By example, the mobile station 10 requests and is assigned to a Paging Frame Class (PFC) that requires the mobile station to be activated only infrequently.

Whether the power saving capability is used, or whether the PFC is used, incoming calls are not allowed, and the user is reached instead by SMS or USSD. In this manner the phone is not required to continually scan for paging information. This furthermore implements a 'do not disturb' function, wherein the mobile station 10 does not 'ring', but the user can still be reached by text messages (e.g., via SMS).

Reference is now made to FIG. 5 for illustrating one method in accordance with this invention. At Block A the user sets the MS 10 to the Message or Pager Mode (as in FIGS. 3A–3B). At Block B the MS 10 effectively powers off with the BMI 32, such as by sending a registration message with a power down indication (also referred to herein as deregistering). At Block C the MS 10 optionally displays a suitable indication on the display 20, such as 'Message Mode Activated' or 'Pager Mode Activated'. This indicates to the user that incoming telephone calls will not be responded to. At Block D the MS 10 enters a low power mode of operation and operates a timer (e.g., the timer 42 of FIG. 4A) which is programmed to periodically interrupt the controller 18. By example, the timeout period may be several minutes. When the timeout period expires the MS 10 powers itself back on and re-registers with the BMI 32 at Block E. The MS 10 then remains powered on for some predetermined period of time, e.g., a few seconds (Blocks F and G), so as to receive any queued SMS or other types of messages from the BMI 32. These messages can be stored in the memory 24 for later display to the user. Control then passes to Block B where the MS 10 re-enters the low power mode and de-registers with the BMI 32. This MS operation continues until the user deactivates the Message or Pager Mode of operation using the keypad 22 and display 20.

Reference may be had to IS-136.1, paragraph 6.3.7, for a description of one suitable and presently preferred registration/de-registration technique.

It should be noted that the ratio of the sleep period (timeout 1) to the awake period (timeout 2) is such that the probability of receiving an incoming voice, data or facsimile call is slight. This advantageously provides a 'do not disturb' function, while also possibly reducing costs in those systems wherein the user is charged for both mobile originated and mobile terminated calls.

The foregoing method of registering and de-registering with the BMI 32 is useful when long sleep times are desired. However, it is also within the scope of this invention to periodically place the MS 10 in the sleep mode without also de-registering from the system. By example, and referring to FIG. 6, at Block A the user sets the MS 10 to the Message or Pager Mode (as in FIGS. 3A–3B). At Block B the MS 10 makes a request to the BMI 32 for a page frame class (PFC) of, by example, 8. With a PFC=8 the MS 10 is ensured that it will receive a paging message from the BMI 32 once every approximately two minutes (PFC=8 is equivalent to a paging frame number (PFN) having a periodicity of 96 hyperframes (see, for example, IS-136.1, pp. 26–28)). At Block C the MS 10 programs the timer for a period that is less than the period between paging messages so as to give the MS 10 the opportunity to resynchronize with the BMI transmission, and then enters the low power sleep mode. By example, the MS 10 is placed in the low power mode of operation for n-x seconds, where x is a period of time at least equal to a time required to resynchronize the MS 10 to the network control channel. The MS 10 remains in the sleep mode for the programmed period at Block D until the sleep mode timer times out. At Block E the MS 10 is activated and receives a paging message on the paging channel. Control passes back to Block C unless the user has terminated the Message Mode of operation.

It should be realized that it is also within the scope of this invention to simply place the MS 10 in a powered-down state, and to then just miss any paging messages that are sent from the BMI 32. In that no transmissions by the MS 10 are required, even further power savings are realized.

Figure 4A:
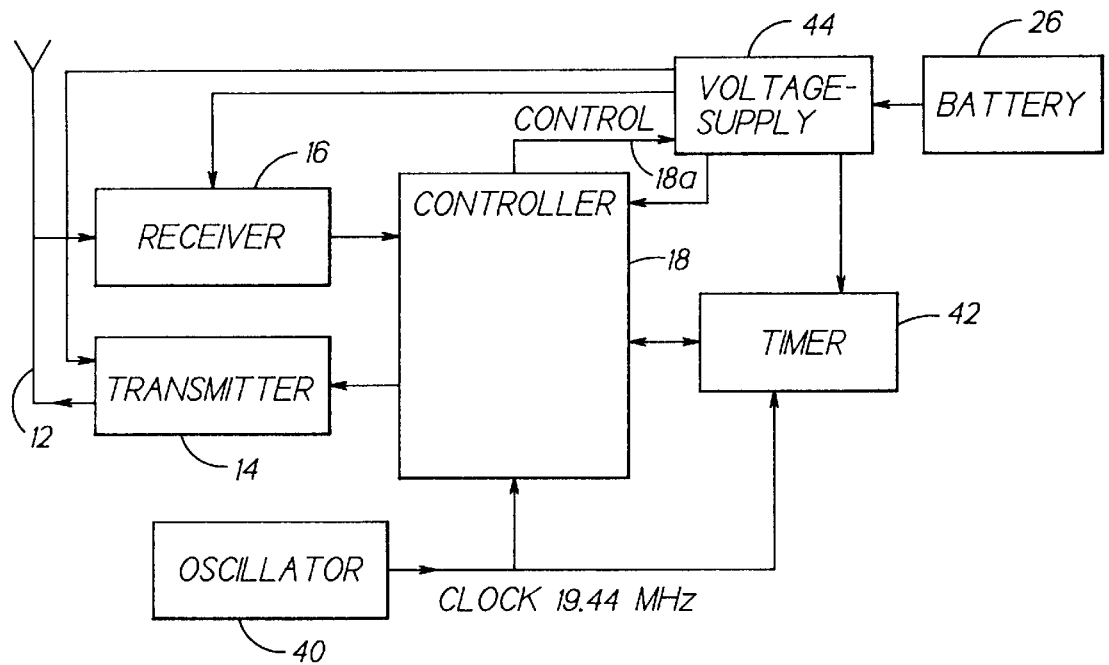
FIGS. 4A and 4B are block diagrams illustrating first and second embodiments of power conserving circuitry in the mobile terminal of FIGS. 1 and 2.
Figure 4B:
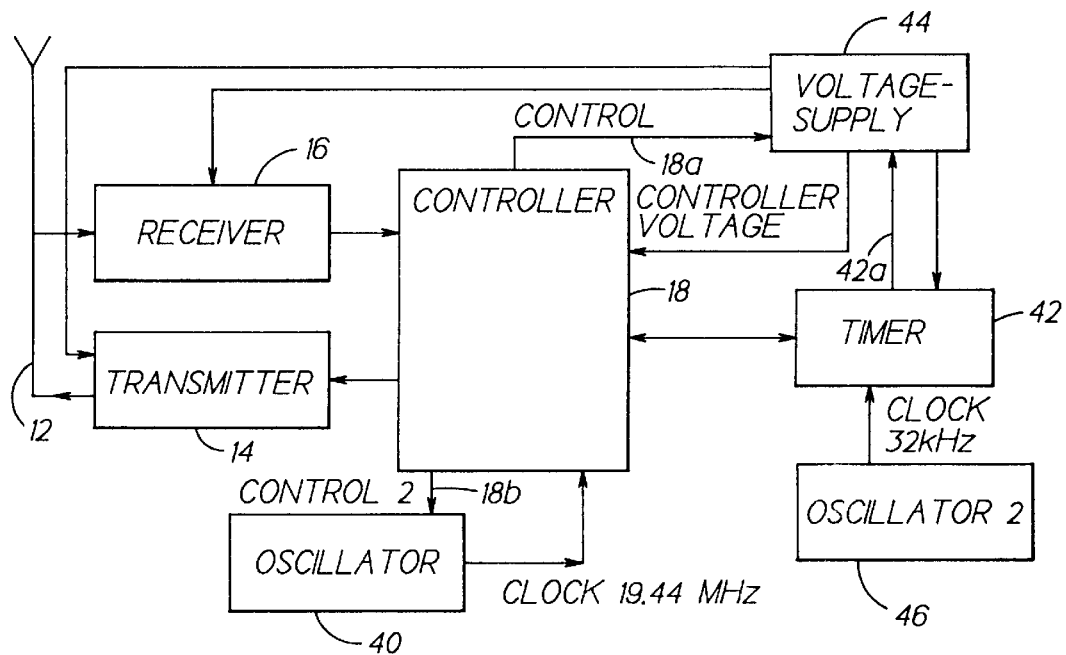

Reference is now made to FIGS. 4A and 4B for showing in greater detail the power reduction circuitry of the MS 10. The circuitry is shown separated into RF-parts and baseband-parts. In addition to the components illustrated in FIG. 1, the MS 10 includes an oscillator 40, timer 42, and voltage supply 44. The controller 18 is coupled to the voltage supply 44 by a control line 18a. The voltage supply may be a voltage regulator or a simple switch. In either case the assertion of the control line 18a causes power to be removed or significantly reduced to the RF-parts and other power consuming portions of the MS 10. The controller 18 is also preferably placed into a power saving sleep mode of operation. The sleep period is measured by the timer 42, which can be a separate logic circuit or a portion of the controller 18. The controller 18 programs the timer 42 at the beginning of the sleep period, and the timer 42 then counts clock pulses generated by the oscillator 40. When the programmed time expires the controller 18 is interrupted or otherwise brought out of the sleep state. The controller 18 then activates the control line 18a to restore power to the various circuits of the MS 10 for receiving signalling messages from the base station 30.

It is noted that the output of the timer 42 could be used for directly restoring power to the various MS 10 circuits. However, it is preferred to have this function controlled by the controller 18. Furthermore, the controller 18 can be employed to implement sleep periods that are significantly longer than can be practically implemented with the timer 42. By example, a sleep period of three minutes can be implemented by programming the timer 42 for one minute periods, and then counting the expiration of the one minute periods with the controller 18.

It is preferable to provide as few clock oscillators as possible in order to reduce cost, improve reliability, and reduce power consumption. Typically the controller 18, timer 42, and RF-parts can all use the output of the single (19.44 MHz) clock oscillator 40, with each section dividing the clock output as required.

However, if it is desired to optimize the MS 10 to achieve minimal power consumption, then a second clock oscillator 46 can be provided as shown in FIG. 4B. The second oscillator 46 preferably has a lower frequency (e.g., 32 kHz) than the oscillator 40, and thus consumes proportionately less power (e.g., 10–100 microamperes vs. 2–10 milliamperes). During normal operation the controller 18 and other components use the oscillator 40. However, during the sleep mode the oscillator 40 is turned off, using a second control line 18b, and the second oscillator 46 is enabled for use. The output of the second oscillator 46 feeds the timer 42.

Even further power savings can be achieved by also removing operating power from the controller 18 during the sleep period. In this case the timer 42 is implemented as a separate component, and is provided with an output control line 42a to at least turn on the voltage supply to the controller 18 when the predetermined timeout period expires.

Using the methods of this invention, in conjunction with power saving circuitry as described above, it has been demonstrated that a ten times decrease in standby or sleep mode power consumption is achieved when operating with an analog (AMPS/TACS/DAMPS) control channel, while a two times decrease in power consumption is observed for a digital control channel embodiment (e.g., IS-136). In both cases the standby or sleep mode time was set at 10 minutes (600 seconds).

In a further embodiment of this invention, which relates most particularly to GSM/PCN or DCS-1900 systems, a two way paging function is provided by employing the Supplementary Service (SS) feature referred to as the Unstructured Supplementary Service Data (USSD). This feature enables the network to send a string of characters to the MS 10, and for the MS 10 to send a string of characters to the network. Using this feature the MS 10 receives a string of characters from the network, which it treats as an incoming paging message that is stored and displayed. The user then interacts with the phone's user interface and a return message is transmitted from the MS 10 to the network. One suitable embodiment for this method is similar to that shown in FIG. 6, but without the Block B.

In the various embodiments of this invention the MS 10 may also compose and transmit a message to the network in response to a received page, thereby implementing a two-way paging service. That is, the controller 18 is responsive to the user interface and to a receipt of a user-related message from the network control channel, for composing and transmitting a message to the network control channel. This message may be interpreted as a reply to the originally received page, and/or as a paging acknowledgement message.

While the invention has been particularly shown and described with respect to preferred embodiments thereof, it will be understood by those skilled in the art that changes in form and details may be made therein without departing from the scope and spirit of the invention.

What is claimed is:

1. A method for operating a wireless terminal of a type that is bidirectionally coupled to a network by a single transceiver through a wireless interface for conducting voice and message-based communications, comprising the steps of:

in response to input from a user, disabling the wireless terminal from receiving a voice call through the single transceiver; and after disabling wireless terminal from receiving said voice call, periodically and automatically enabling the wireless terminal, a predetermine interval of time, to receive and store at least one user message, the user message being received through the single transceiver from a network.

2. A method as set forth in claim 1, wherein the step of disabling includes a step of deregistering the wireless terminal from the network.

3. A method as set forth in claim 2, wherein the step of periodically enabling includes an initial step of re-registering the wireless terminal with the network.

4. A method as set forth in claim 1, wherein the step of disabling includes a step of reducing the power consumption of the wireless terminal, and wherein the step of periodically and automatically enabling includes an initial step of restoring the power consumption of the wireless terminal to an operational level.

5. A method as set forth in claim 1, wherein the step of periodically any automatically enabling includes an initial step of requesting the network to assign the wireless terminal to a predetermined paging frame class.

6. A method as set forth in claim 5, wherein the predetermined paging frame class insures that the wireless terminal will receive a paging message from the network every n seconds, and wherein the step of periodically and automatically enabling further includes the step of placing the wireless terminal in a low power mode of operation for n-x seconds, where x is a period of time at least equal to a time required to resynchronize the wireless terminal to a network control channel.

7. A method as set forth in claim 1, wherein the step of periodically and automatically enabling includes a step of receiving at least one Short Message Service (SMS) message from the network.

8. A method as set forth in claim 1, wherein the step of periodically and automatically enabling includes a step of receiving at least one Callback Number message from the network.

9. A method as set forth in claim 1, wherein the step of periodically and automatically enabling includes a step of receiving at least one Voice Mail Notification message from the network.

10. A method as set forth in claim 1, wherein the step of periodically and automatically enabling includes a step of receiving at least one Unstructured Supplementary Service Data (USSD) message from the network.

11. A method as set forth in claim 1, and further comprising a step of displaying a received and stored user message to the user using a wireless terminal display means.

12. A wireless terminal of a type that is bidirectionally coupled to a network by a single transceiver through a wireless interface for conducting voice and message-based communications, comprising;

user interface means;

means, responsive to input from a user at said user interface means, for disabling the wireless terminal from receiving a voice call through the single transceiver; and means, responsive to said disabling means disabling the wireless terminal from receiving said voice call, for periodically and automatically enabling said wireless terminal, a predetermined interval of time to receive at least one user message through the single transceiver from a network, and for storing and displaying at least one user message.

13. A wireless terminal as set forth in claim 12, wherein said disabling means includes means for de-registering the wireless terminal from the network, and wherein said means for periodically and automatically enabling includes means for re-registering the wireless terminal with the network.

14. A wireless terminal as set forth in claim 12, wherein said disabling means includes means for reducing the power consumption of the wireless terminal, and wherein said means for periodically and automatically enabling includes means for restoring the power consumption of the wireless terminal to an operational level.

15. A wireless terminal as set forth in claim 12, wherein said user interface means includes means for displaying a menu to the user, and further comprising means for selecting a paging function from the menu.

16. A wireless terminal as set forth in claim 12, wherein said means for periodically and automatically enabling includes means for requesting the network to assign the wireless terminal to a predetermined paging frame class so that the wireless terminal will receive a paging message from the network every n seconds, and further comprising means for placing said wireless terminal into a low power mode of operation for n-x seconds, where x is a period of time at least equal to a time required to resynchronize said wireless terminal to said network control channel.

17. A wireless terminal as set forth in claim 12, wherein said means for periodically and automatically enabling enables said wireless terminal to receive at least one of a Short Message Service (SMS) message from the network, a Callback Number message from the network, and a Voice Mail Notification message from the network.

18. A wireless terminal as set forth in claim 12, wherein said means for periodically and automatically enabling enables said wireless terminal to receive at least one Unstructured Supplementary Service Data (USSD) message from the network.

19. A wireless terminal as set forth in claim 12, wherein said wireless terminal includes means for placing said wireless terminal in a low current consumption mode of operation, and further comprising programmable timer means for signalling a wireless terminal control means at an expiration of a programmed low current consumption mode interval.

20. A wireless terminal as set forth in claim 19, wherein said wireless terminal control means operates with a first clock frequency (F1), and wherein said programmable timer means operates with a second clock frequency (F2) during the programmed low current consumption mode interval, and F2<F1.

21. A wireless terminal as set forth in claim 12, and further comprising means, responsive to said user interface means and to a receipt of a message from a network control channel, for composing and transmitting a message over said network control channel.

22. A method for operating a wireless terminal capable of transceiving both voice-based and message-based communications through a single transceiver; comprising the steps of:

in response to input from a user, disabling the wireless terminal from receiving voice calls though the single transceiver; and after disabling wireless terminal from receiving said voice call, periodically and automatically enabling the wireless terminal, a predetermine interval of time, to only receive and store, through the single transceiver, at least one user message from a network.

23. A method as set forth in claim 22, wherein the step of periodic and automatically enabling includes a step of receiving from the network at least one of a Short Message Service (SMS) message, a Callback Number message, a Voice Mail Notification message, or an Unstructured Supplementary Service Data (USSD) message.

* * * * *